(12) United States Patent
Maruyama (10) Patent No.: US 11,237,384 B2
(45) Date of Patent: Feb. 1, 2022

(54) OPTICAL SCANNING DEVICE

(71) Applicant: Yuki Maruyama, Tokyo (JP)

(72) Inventor: Yuki Maruyama, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 70 days.

(21) Appl. No.: 16/702,734

(22) Filed: Dec. 4, 2019

(65) Prior Publication Data

US 2020/0201029 A1    Jun. 25, 2020

(30) Foreign Application Priority Data

Dec. 21, 2018  (JP) .............................. JP2018-240016

(51) Int. Cl.
*G02B 26/08*  (2006.01)
*G02B 26/10*  (2006.01)

(52) U.S. Cl.
CPC ......... *G02B 26/0858* (2013.01); *G02B 26/10* (2013.01)

(58) Field of Classification Search
None
See application file for complete search history.

(56) References Cited

U.S. PATENT DOCUMENTS

| 9,581,810 | B2* | 2/2017 | Aga | .................... H01L 41/0953 |
| 10,838,197 | B2* | 11/2020 | Yamada | ............... G02B 26/101 |
| 11,143,863 | B2* | 10/2021 | Yamada | ............... G02B 26/101 |
| 2005/0254149 | A1* | 11/2005 | Orcutt | ................ G02B 26/0833 |
| | | | | 359/848 |
| 2012/0162739 | A1* | 6/2012 | Yamada | ............... G02B 26/101 |
| | | | | 359/212.1 |
| 2019/0285876 | A1* | 9/2019 | Yamada | ............... G02B 26/101 |

FOREIGN PATENT DOCUMENTS

| EP | 3276393 | 1/2018 |
| JP | 2018-017832 | 2/2018 |

* cited by examiner

*Primary Examiner* — Jennifer D. Carruth
(74) *Attorney, Agent, or Firm* — IPUSA, PLLC (57) ABSTRACT

An optical scanning device includes a mirror that includes a mirror reflection surface, and torsion bars that support the corresponding sides of the mirror and cause the mirror to rotate. The torsion bars are formed of a silicon active layer whose surface is exposed.

9 Claims, 9 Drawing Sheets

VERTICAL DIRECTION

OPTICAL SCANNING DEVICE

CROSS-REFERENCE TO RELATED APPLICATION

The present application is based upon and claims priority to Japanese Patent Application No. 2018-240016, filed on Dec. 21, 2018, the entire contents of which are incorporated herein by reference.

BACKGROUND OF THE INVENTION

1. Field of the Invention

An aspect of this disclosure relates to an optical scanning device.

2. Description of the Related Art

There is a known optical scanning device including a mirror and torsion bars that support the corresponding sides of the mirror. The mirror is rotated using the torsion bars as a shaft to deflect and scan incident light. Such an optical scanning device is manufactured by etching, for example, a silicon-on-insulator (SOI) substrate using a Micro Electro Mechanical System (MEMS) technology.

Each torsion bar is formed of a silicon active layer included in the SOI substrate. Oxide films are formed on the surface of the torsion bar during the manufacturing process (see, for example, Japanese Laid-Open Patent Publication No. 2018-017832).

Here, the oxide films on the torsion bar are weaker than the silicon active layer forming the torsion bar and therefore tend to be damaged by stress generated in the torsion bar when the mirror is rotated. If the oxide films are damaged, a fatigue fracture starting from the damaged oxide films may occur in the torsion bar.

SUMMARY OF THE INVENTION

In an aspect of this disclosure, there is provided an optical scanning device including a mirror that includes a mirror reflection surface, and torsion bars that support the corresponding sides of the mirror and cause the mirror to rotate. The torsion bars are formed of a silicon active layer whose surface is exposed.

DESCRIPTION OF THE PREFERRED EMBODIMENTS

First Embodiment

Figure 1:
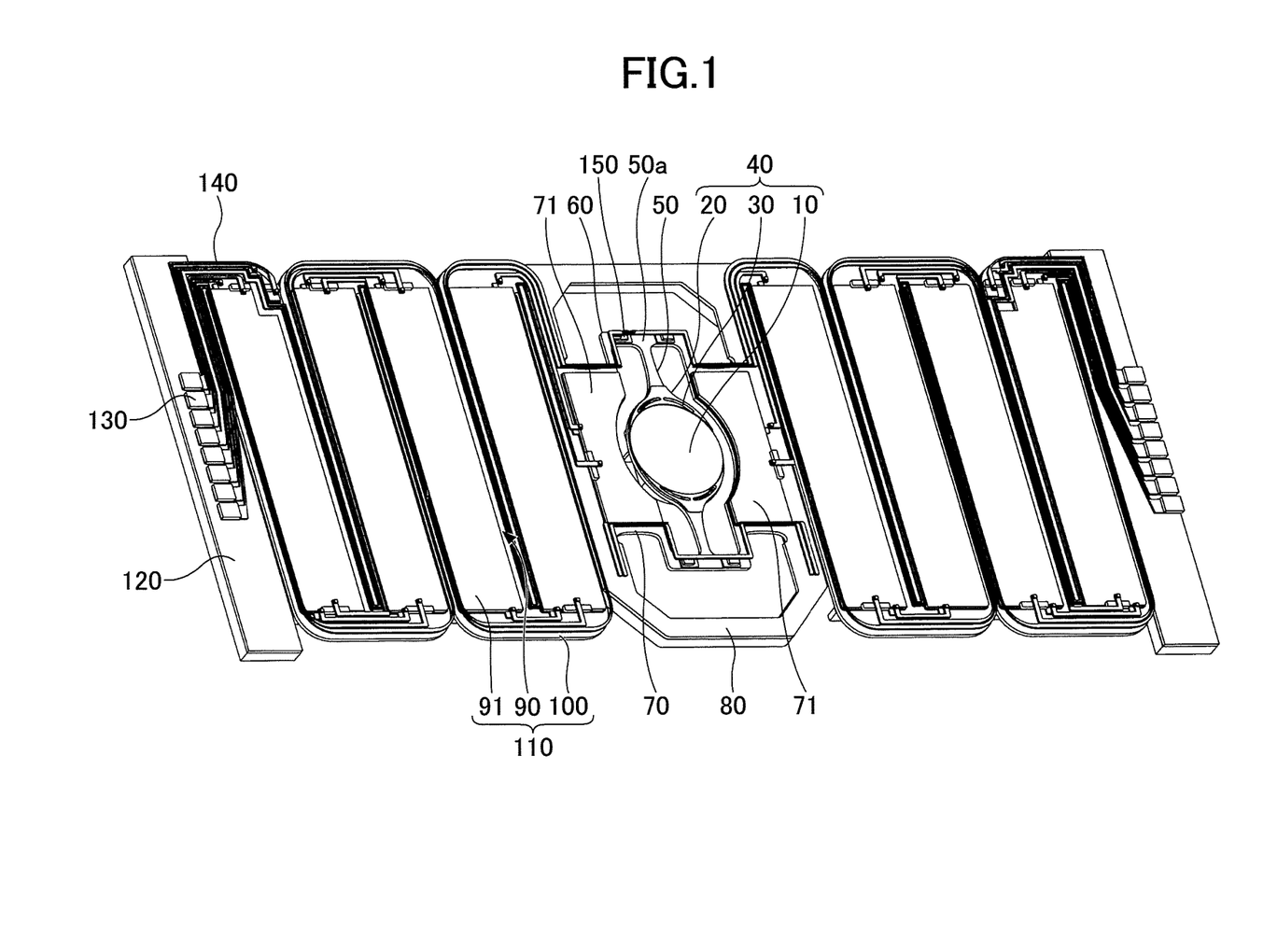
FIG. 1 is a top perspective view of an optical scanning device according to a first embodiment.

A first embodiment is described below with reference to the accompanying drawings. FIG. 1 is a top perspective view of an optical scanning device according to the first embodiment.

As illustrated in FIG. 1, the optical scanning device of the first embodiment includes a mirror 40, torsion bars 50, coupling parts 60, horizontal driving beams 70, driving sources 71, a movable frame 80, a vertical driving part 110, a frame 120, terminals 130, and wires 140. The mirror 40 includes a mirror reflection surface 10 and a stress relaxation region 20. The vertical driving part 110 includes vertical driving beams 90, driving sources 91, and coupling parts 100.

The mirror 40 is sandwiched between two torsion bars 50 that are aligned on the same straight line and support the corresponding sides of the mirror 40. The mirror 40 includes the mirror reflection surface in the center and the stress relaxation region 20 between the mirror reflection surface 10 and each of the torsion bars 50. Two slits 30 are formed in each stress relaxation region 20. A base end 50a of the torsion bar 50 is connected to the inner corners of the horizontal driving beams 70 via the coupling parts 60. The driving source 71 is disposed on the surface of each horizontal driving beam 70, and the outer side of the horizontal driving beam 70 is connected to the movable frame 80.

The movable frame 80 supports the coupling parts 60, the torsion bars 50, and the mirror 40 via the horizontal driving beams 70, and surrounds these components. One end of the movable frame 80 is connected to one end of the innermost vertical driving beam 90, and another end of the innermost vertical driving beam 90 is connected to an end of a vertical driving beam 90 disposed on the outer side of the innermost vertical driving beam 90.

Multiple vertical driving beams 90 are provided on each side of the movable frame 80, i.e., to sandwich the movable frame 80, and each of the vertical driving beams 90 extends parallel to the torsion bars 50. On each side of the movable frame 80, four vertical driving beams 90 are provided. Among the four vertical driving beams 90, one end of the innermost vertical driving beam 90, which is adjacent to the movable frame 80, is connected to one end of the movable frame 80, and another end of the innermost vertical driving beam 90 is connected via a coupling part 100 to one end of the second innermost vertical driving beam 90. Each coupling part 100 is disposed on the outer side of the vertical driving beams 90 in the vertical direction (the direction in which each vertical driving beam 90 extends). Another end of the second innermost vertical driving beam 90 is connected via another coupling part 100 to one end of the second outermost vertical driving beam 90. Another end of the second outermost vertical driving beam 90 is connected via another coupling part 100 to one end of the outermost vertical driving beam 90. Another end of the outermost vertical driving beam 90 is connected to the frame 120. The driving source 91 is provided on each of the vertical driving beams 90.

The frame 120 supports the vertical driving part 110 via the outermost vertical driving beams 90. The terminals 130 are provided on the upper surface of the frame 120, and the wires 140 are connected to the terminals 130. Each of the driving sources 71 and 91 may be implemented by, for example, a piezoelectric element that expands and contracts according to an applied voltage. The wires 140 supply voltages to the driving sources 71 and 91.

In FIG. 1, the frame 120 is illustrated on each side of the vertical driving part 110. However, in practice, the frame 120 is provided to surround the vertical driving part 110 and the movable frame 80.

A piezoelectric sensor 150 is provided on the base end 50a of the torsion bar 50. The piezoelectric sensor 150 functions as a horizontal tilt angle sensor that detects a degree of inclination (horizontal tilt angle) of the mirror reflection surface 10 when the mirror 40 is rotating (or oscillating) in the horizontal direction.

Next, the components of the optical scanning device are described in more detail.

The mirror 40 includes a substantially-circular mirror reflection surface 10 in the center. The mirror reflection surface 10 is formed of a film of a highly-reflective metal such as silver, copper, or aluminum.

The stress relaxation region 20 is a spacer provided between the torsion bar 50 and the mirror reflection surface 10 to relax the torsional stress of the torsion bar 50 and reduce the stress applied to the mirror reflection surface 10. The stress relaxation region 20 can disperse the stress generated by the torsional motion of the torsion bar 50 and relax the stress applied to the mirror reflection surface 10.

The slits 30 are formed in the stress relaxation region 20 to disperse the stress applied to the stress relaxation region 20.

The torsion bars 50 support the corresponding sides of the mirror 40 and cause the mirror 40 to rotate (or oscillate) in the horizontal direction. Here, the horizontal direction indicates a direction in which light reflected by the mirror reflection surface 10 is scanned at high speed, i.e., the lateral direction of a projection surface. That is, the horizontal direction is a direction in which the mirror reflection surface 10 is rotated laterally around the torsion bars 50. The torsion bars 50 are twisted alternately left and right and cause the mirror 40 to rotate (or oscillate) in the horizontal direction.

The coupling parts 60 transmit the horizontal driving force generated at the horizontal driving beams 70 to the torsion bars 50.

The horizontal driving beams 70 cause the mirror 40 to rotate (or oscillate) in the horizontal direction and thereby cause light reflected by the mirror reflection surface 10 to scan a projection surface in the horizontal direction. The right and left horizontal driving beams 70 are caused to warp alternately in opposite directions by alternately applying voltages with different phases to the driving sources 71 on the right and left sides of the mirror 40. As a result, a torsional force is applied to the torsion bars 50, and the mirror 40 is rotated about a horizontal-rotation axis that is parallel to the torsion bars 50.

For example, the horizontal driving beams 70 drive the mirror 40 by resonant driving. When, for example, the optical scanning device of the present embodiment is applied to a projector, the mirror 40 is driven by 30-kHz resonant driving.

The driving source 91 is provided on each of the vertical driving beams 90 included in the vertical driving part 110, and the vertical driving beams 90 can be driven independently of each other. Also, the movable frame 80 can be rotated (or caused to oscillate) forward and backward in the vertical direction by applying voltages with different phases to adjacent vertical driving beams 90. Because the mirror 40 is supported by the movable frame 80, the mirror 40 rotates (or oscillates) in the vertical direction around a vertical rotation axis orthogonal to the torsion bars 50 along with the rotation (or oscillation) of the movable frame 80.

For example, the vertical driving part 110 rotates the movable frame 80 by nonresonant driving. Compared with horizontal driving, vertical driving does not require high-speed driving, and the drive frequency of vertical driving is, for example, about 60 Hz.

Figure 2:
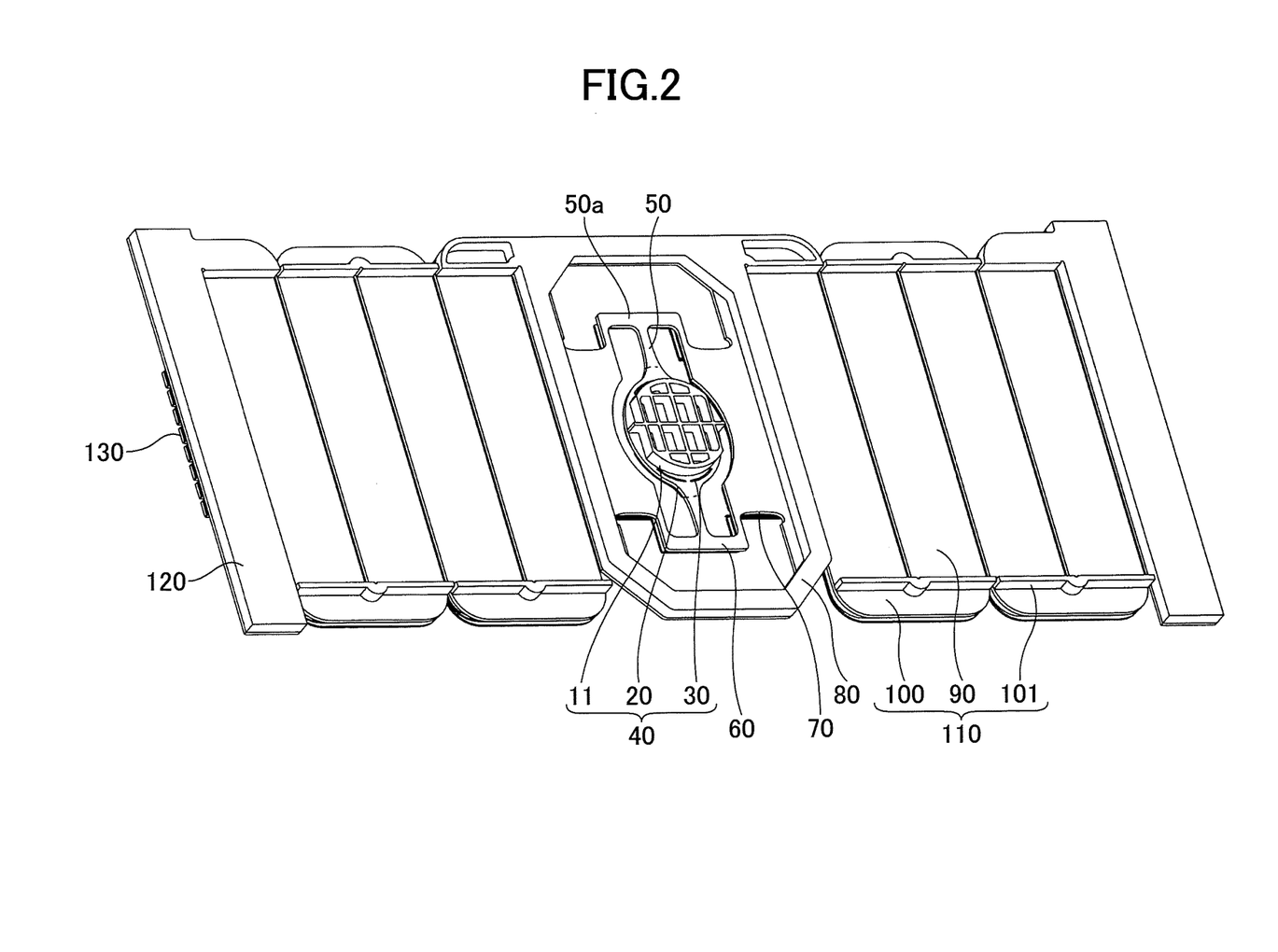
FIG. 2 is a bottom perspective view of the optical scanning device according to the first embodiment.

FIG. 2 is a bottom perspective view of the optical scanning device according to the first embodiment. In FIGS. 1 and 2, the same reference numbers are assigned to the corresponding components.

In FIG. 2, a rib 11 is provided on the back side of the mirror reflection surface 10. The rib 11 has a function to suppress the distortion of the mirror reflection surface 10 while the mirror 40 is being driven and to keep the mirror reflection surface 10 flat. The rib 11 has an outer shape that is substantially the same as the shape of the mirror reflection surface 10. This configuration makes it possible to make the entire mirror reflection surface 10 flat.

A rib 101 is also formed on the back side of the coupling part 100. The rib 101 strengthens the connection between adjacent vertical driving beams 90 and increases the rigidity of the vertical driving beams 90.

Figure 3:
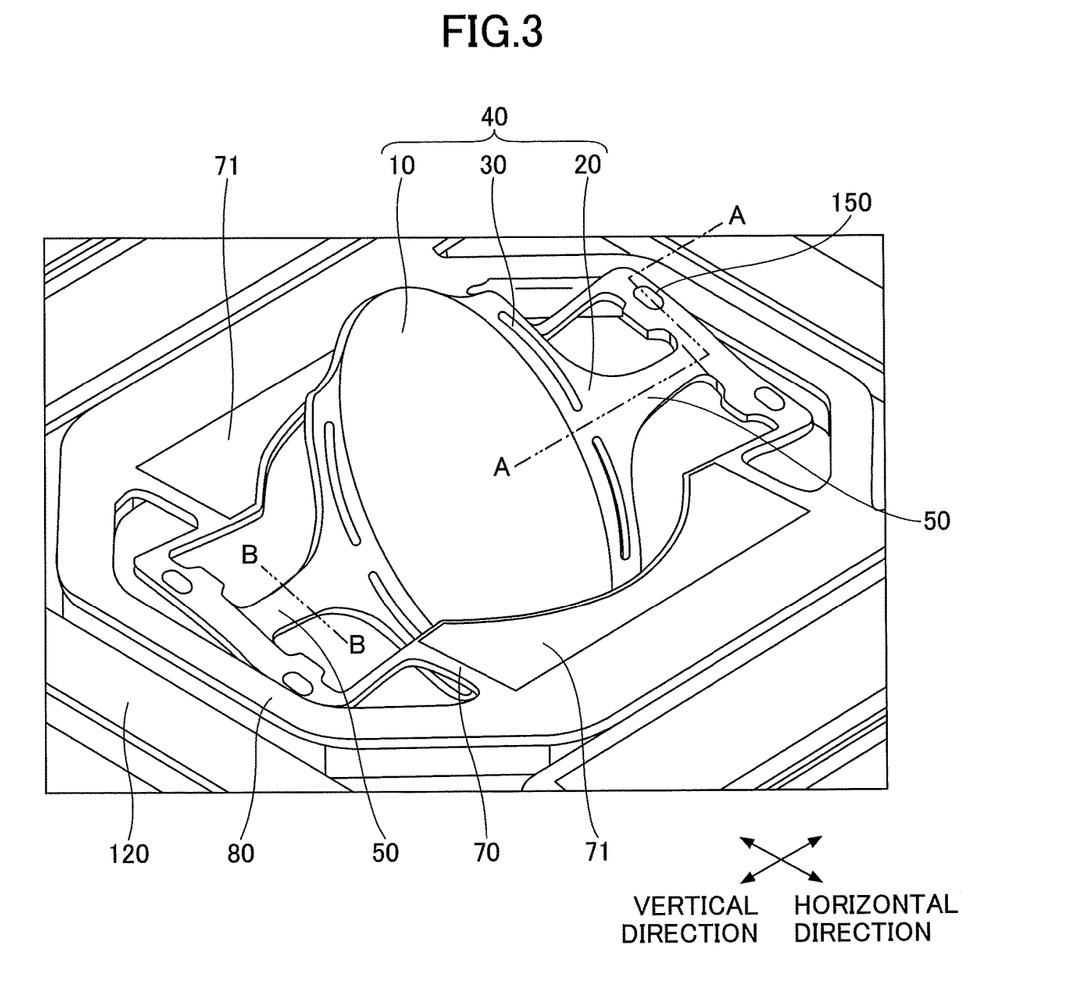
FIG. 3 is an enlarged view of a mirror whose mirror reflection surface is tilted in the horizontal direction.

FIG. 3 is an enlarged view of the mirror 40 whose mirror reflection surface 10 is tilted in the horizontal direction. When the mirror reflection surface 10 is tilted as illustrated in FIG. 3, stress is mainly generated in substantially the center of the torsion bar 50.

Figure 4:
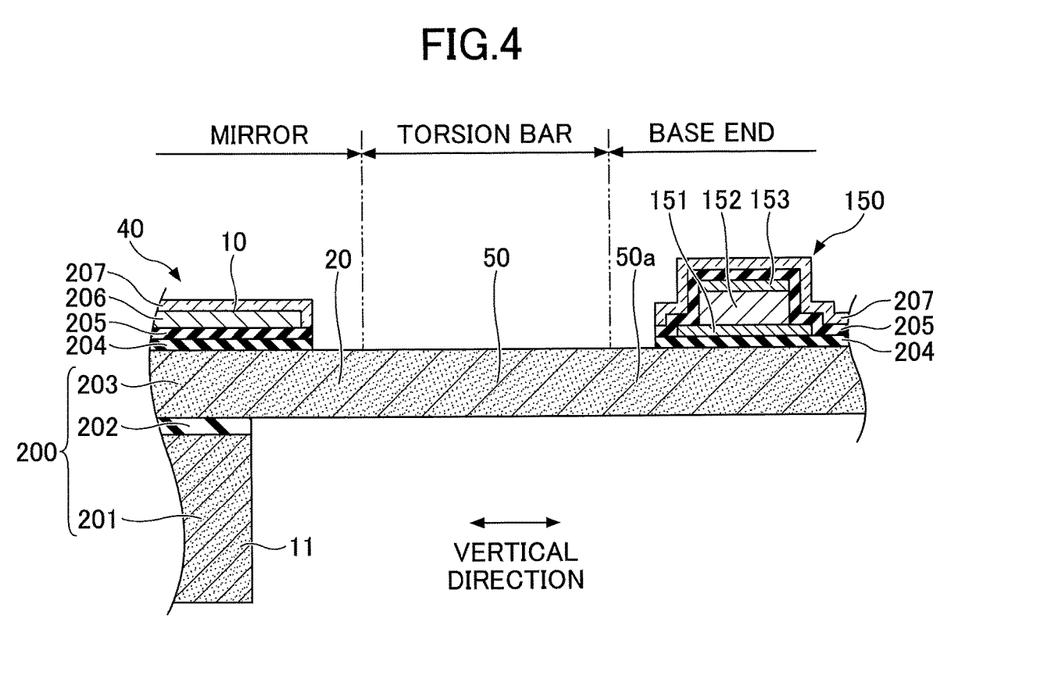
FIG. 4 is a cross-sectional view taken along line A-A in FIG. 3.

FIG. 4 is a cross-sectional view taken along line A-A in FIG. 3. As illustrated in FIG. 4, the optical scanning device of the present embodiment is formed by using an SOI substrate 200. The SOI substrate 200 includes a support substrate 201 formed of silicon (Si), a buried oxide (BOX) layer 202, and a silicon active layer 203 that are stacked in this order. The BOX layer 202 is an oxide insulating film formed of silicon dioxide ($SiO_2$). The silicon active layer 203 is formed of single-crystal silicon.

Most parts of the mirror 40, the torsion bars 50, the coupling parts 60, and the horizontal driving beams 70 are formed to have elasticity based on the silicon active layer 203 that remains after the support substrate 201 and the box layer 202 are removed by etching.

The ribs 11 and 101 are formed by patterning the support substrate 201 by etching.

In the mirror 40, a surface oxide film 204 is formed on the silicon active layer 203. The surface oxide film 204 is a silicon thermal oxide film ($SiO_2$) formed on the surface of the silicon active layer 203 by performing a thermal oxidation treatment on the silicon active layer 203.

An interlayer insulating film 205 is formed on the surface oxide film 204. The interlayer insulating film 205 is formed of, for example, alumina ($Al_2O_3$). A metal film 206 is formed on the interlayer insulating film 205 to form the mirror reflection surface 10. The metal film 206 is formed of, for example, a silver (Ag) alloy. The interlayer insulating film 205 adhere well to the metal film 206. The metal film 206 is formed on the interlayer insulating film 205 by, for example, sputtering.

A reflectance increasing film 207 is formed on the metal film 206 that functions as the mirror reflection surface 10. The reflectance increasing film 207 is a multilayer dielectric film formed by stacking dielectric films with different refractive indices. The multilayer dielectric film functions as a reflectance increasing film that increases the reflectance of light in a low wavelength region (a region lower than a wavelength of 550 nm) in the visible light region. The reflectance increasing film 207 is a multilayer dielectric film formed by stacking a high-refractive-index film formed of, for example, titanium oxide on a low-refractive-index film formed of, for example, alumina. The difference in refractive index between the low-refractive-index film and the high-refractive-index film is preferably large.

In the region on the base end 50*a* where the piezoelectric sensor 150 is formed, the surface oxide film 204 is formed on the silicon active layer 203. A lower electrode 151, a piezoelectric body 152, and an upper electrode 153 are stacked on the surface oxide film 204 in this order. The piezoelectric sensor 150 is comprised of the lower electrode 151, the piezoelectric body 152, and the upper electrode 153.

The lower electrode 151 and the upper electrode 153 are formed of, for example, platinum (Pt). The piezoelectric body 152 is a lead zirconate titanate (PZT) thin film. The interlayer insulating film 205 is formed on the upper electrode 153. The reflectance increasing film 207 is formed on the interlayer insulating film 205.

The torsion bar 50 is formed solely of the silicon active layer 203. That is, in the region where the torsion bar 50 is formed, all of the surface oxide film 204, the interlayer insulating film 205, and the reflectance increasing film 207 formed on the silicon active layer 203 are removed, and the silicon active layer 203 is exposed.

Also, in the stress relaxation region 20 and regions of the base end 50*a* where the piezoelectric sensor 150 is not formed, the surface oxide film 204, the interlayer insulating film 205, and the reflectance increasing film 207 are removed, and the silicon active layer 203 is exposed.

Also, in the region where the torsion bar 50 is formed, the BOX layer 202 disposed on the lower surface of the silicon active layer 203 is also removed such that the silicon active layer 203 is exposed. Further, in areas of the lower surface of the silicon active layer 203 where the support substrate 201 is removed, the BOX layer 202 is also removed.

Figure 5:
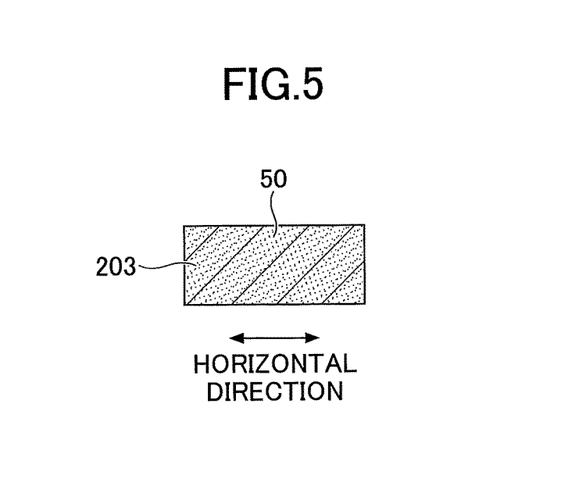
FIG. 5 is a cross-sectional view taken along line B-B in FIG. 3.

FIG. 5 is a cross-sectional view taken along line B-B line in FIG. 3. As illustrated in FIG. 5, in the region where the torsion bar 50 is formed, oxide films are also removed from the side surfaces of the silicon active layer 203 such that the silicon active layer 203 is exposed.

Figure 6:
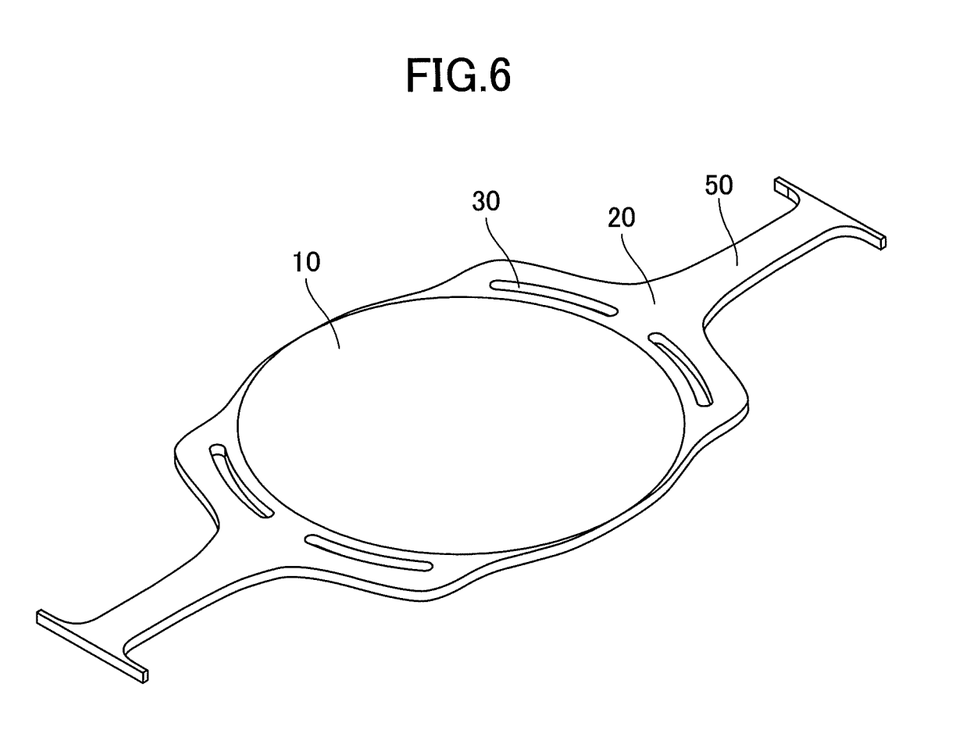
FIG. 6 is a drawing illustrating exposed portions of a silicon active layer.

FIG. 6 is a drawing illustrating exposed portions of the silicon active layer 203. In FIG. 6, in regions other than the region where the mirror reflection surface 10 is formed, oxide films are removed from the surfaces (upper surfaces, lower surfaces, and side surfaces) of the torsion bar 50 and the stress relaxation region 20 and from the side surfaces in the slits 30 such that the silicon active layer 203 is exposed.

Figure 7:
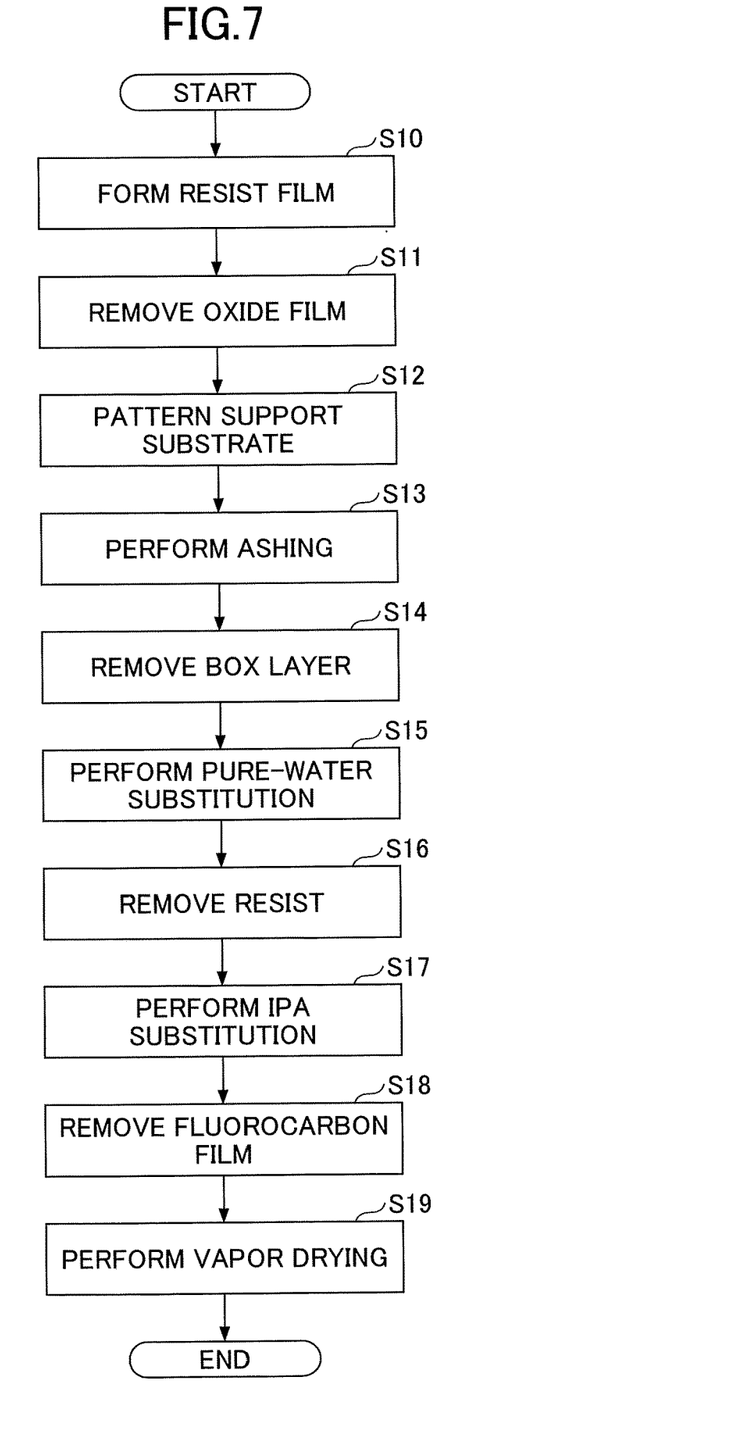
FIG. 7 is a flowchart illustrating a process performed on an SOI substrate.

Next, a process performed on the SOI substrate 200 is described with reference to FIGS. 7 through 10. FIG. 7 is a flowchart illustrating a process performed on the SOI substrate 200. FIGS. 8A through 10 are cross-sectional views of the SOI substrate 200 during the process.

Figure 8A:
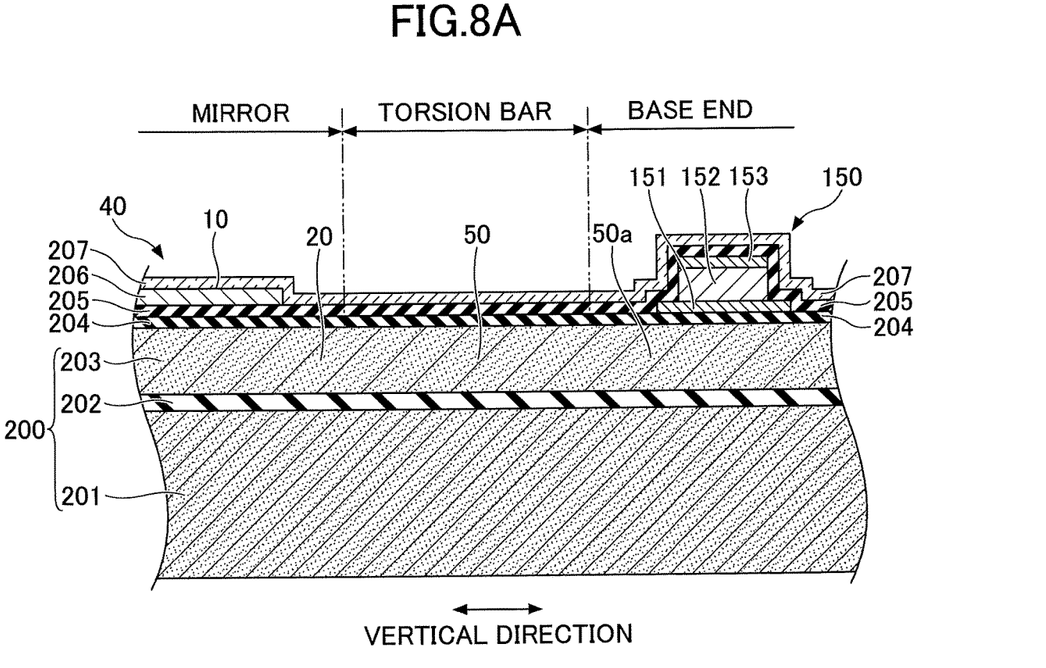
FIGS. 8A and 8B are cross-sectional views of the SOI substrate during the process.

When the optical scanning device of the present embodiment is manufactured, various film forming and patterning steps are performed, and elements such as the mirror 40 and the piezoelectric sensor 150 are formed on the SOI substrate 200 as illustrated in FIG. 8A. As the elements are formed, the surface oxide film 204, the interlayer insulating film 205, and the reflectance increasing film 207 are formed in the region of the SOI substrate 200 where the torsion bar 50 is to be formed.

Figure 8B:
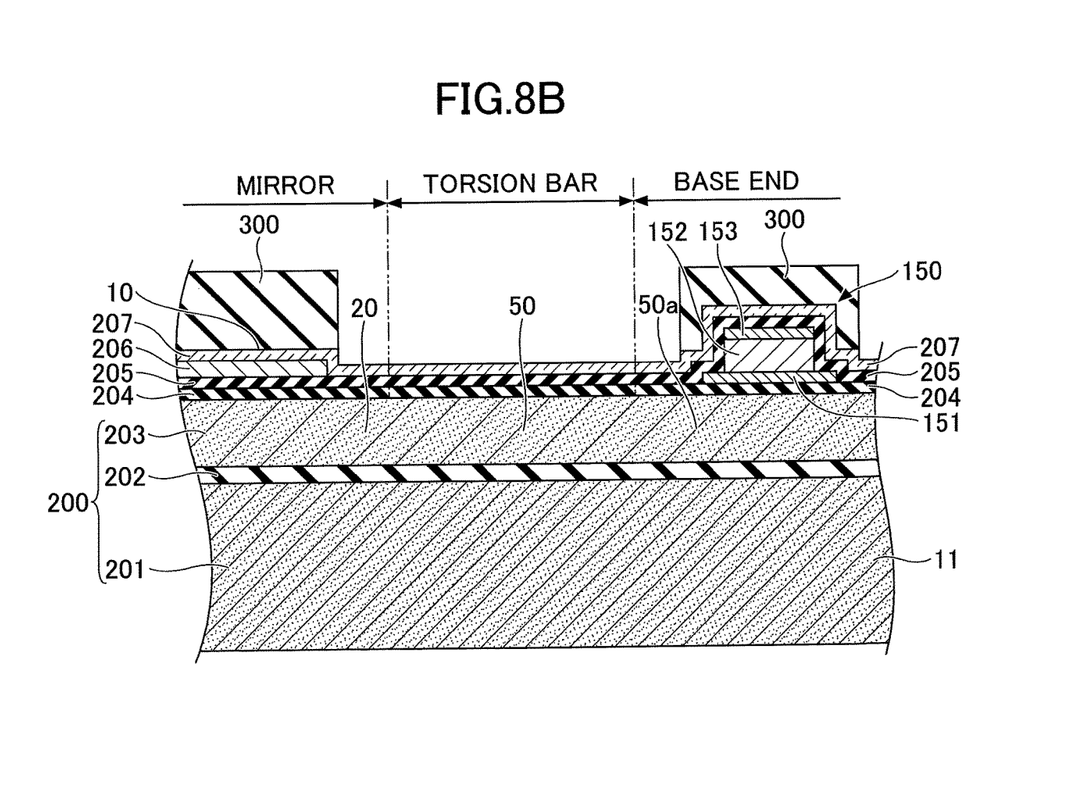
Figure 9A:
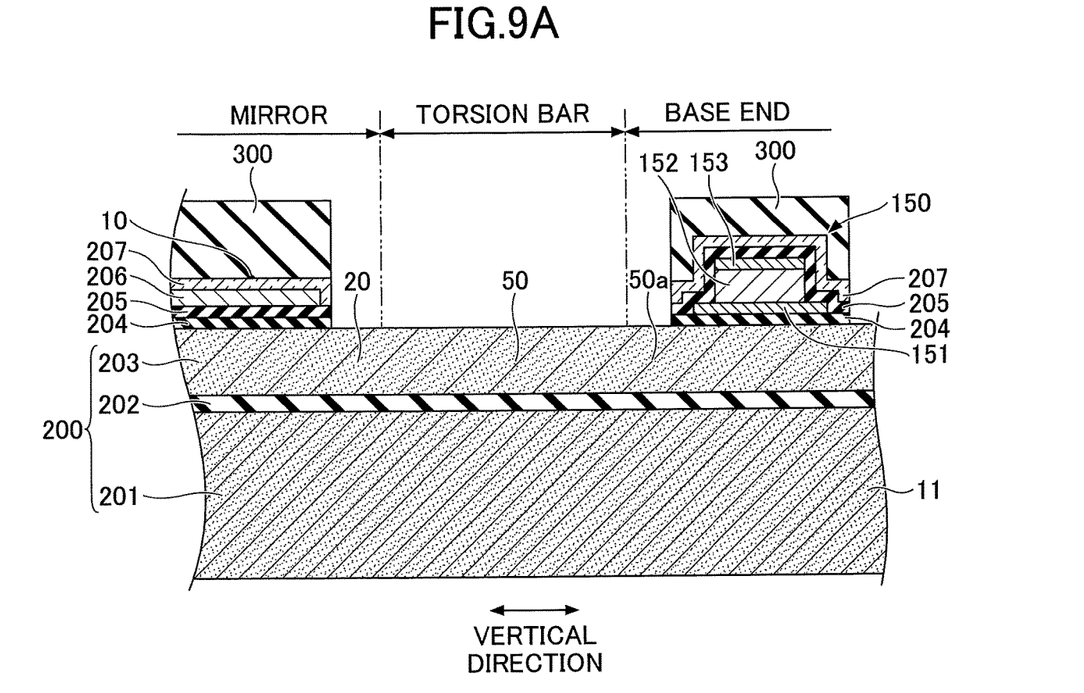
FIGS. 9A and 9B are cross-sectional views of the SOI substrate during the process.

Next, as illustrated in FIG. 8B, a resist film 300 is formed above the silicon active layer 203 to cover the elements such as the mirror 40 and the piezoelectric sensor 150 (step S10 in FIG. 7). Next, wet etching is performed on the upper side of the SOI substrate 200. As a result, as illustrated in FIG. 9A, oxide films, which are formed on the upper surface of the silicon active layer 203 and exposed through the resist film 300, are removed (step S11). Here, hydrofluoric acid (HF) or ammonium fluoride (BHF) is used as an etchant for the wet etching. The oxide films removed in this step includes the surface oxide film 204, the interlayer insulating film 205, and the reflectance increasing film 207.

Figure 9B:
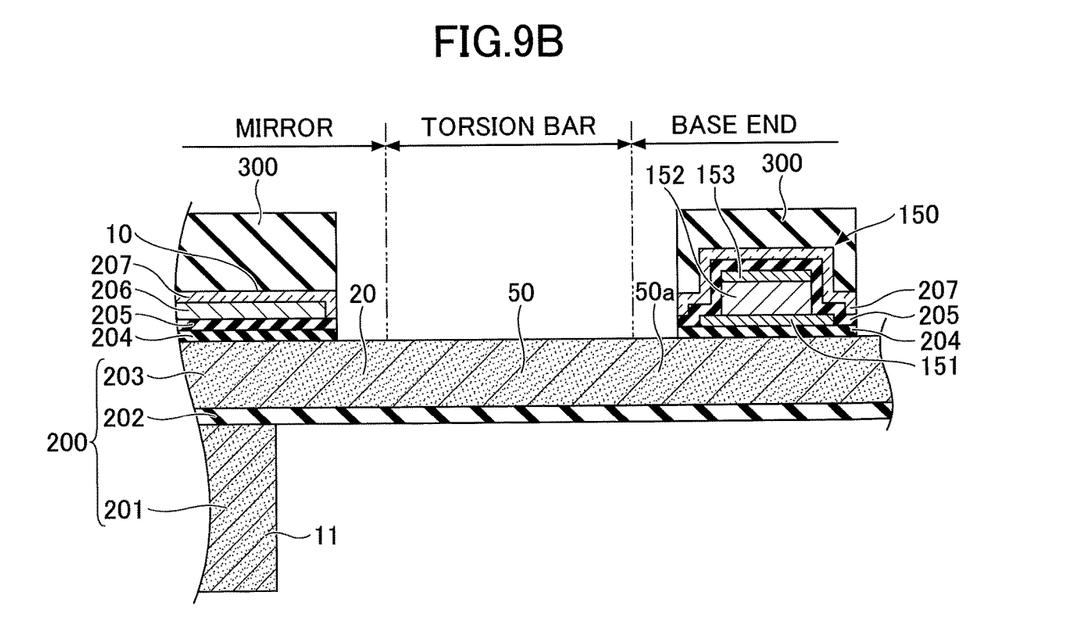

Next, to reduce the thickness of the mirror 40, the torsion bar 50, the coupling part 60, and the horizontal driving beam 70 and thereby make them elastic, a resist pattern (not shown) is formed on the surface of the support substrate 201, and the support substrate 201 is patterned by performing dry etching using the resist pattern (step S12). As a result of patterning the support substrate 201, the above-described components are thinned, and the rib 11 is formed as illustrated in FIG. 9B.

After the patterning, ashing is performed (step S13). The ashing removes the superficial layer of the resist pattern that is hardened by the dry etching.

Figure 10:
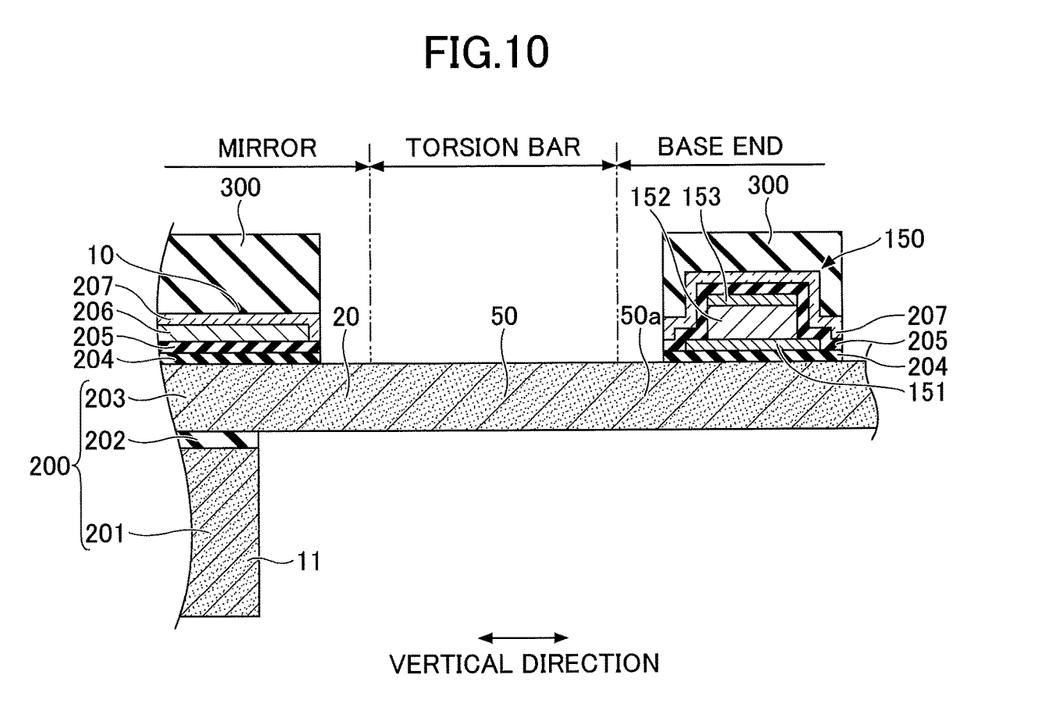
FIG. 10 is a cross-sectional view of the SOI substrate during the process.

Next, as illustrated in FIG. 10, wet etching is performed on the lower side of the SOI substrate 200 to remove the BOX layer 202 that is exposed as a result of patterning the support substrate 201 (step S14). The etchant used for the wet etching at step S14 is the same as the etchant used at step S11.

Next, pure-water substitution is performed (step S15), and resists are removed by wet processing (step S16). At this step, the resist film 300 formed on the upper side of the SOI substrate 200 and the resist pattern (not shown) formed on the lower side of the SOI substrate 200 are removed. Next, IPA substitution is performed to replace pure water with isopropyl alcohol (IPA) whose surface tension is less than the surface tension of pure water (step S17).

After the etching of the support substrate 201 and the oxide films described above, fluorocarbon generated on the side surfaces of the silicon active layer 203 is removed (step S18). The fluorocarbon is preferably removed because the fluorocarbon may cause a brittle fracture, such as a crack, in the silicon active layer 203. For example, the fluorocarbon is removed by wet etching using a hydrofluoroether (HFE) as an etchant. HFE is a mixed liquid of methyl nonafluorobutyl ether and methyl nonafluoroisobutyl ether.

Then, vapor drying is performed (step S19), and the process is completed.

At steps S11 and S14 in the above process, wet etching is used instead of dry etching to remove the oxide films from the surface of the silicon active layer 203. This is because the silicon active layer 203 is damaged if dry etching is used.

Wet etching is also used at step S18 to remove fluorocarbon. This is also because the silicon active layer 203 is damaged if dry etching is used.

As described above, in the optical scanning device of the present embodiment, the silicon active layer 203 forming the torsion bar 50 is exposed by removing oxide films from the surface of the silicon active layer 203.

If oxide films (the surface oxide film 204, the interlayer insulating film 205, the reflectance increasing film 207, and the BOX layer 202), which are weaker than the silicon active layer 203, are formed on the surface of the silicon active layer 203, the oxide films tend to be damaged by stress generated when the mirror 40 is rotated. If the oxide films are damaged, a fatigue fracture starting from the damaged oxide films may occur in the torsion bar 50. However, because the oxide films are removed from the silicon active layer 203 in the present embodiment, the torsion bar 50 has better fracture resistance. This in turn improves the life of the optical scanning device.

Also in the present embodiment, fluorocarbon generated on the side surfaces of the silicon active layer 203 after etching is also removed. This further improves the fracture resistance of the torsion bar 50 and further improves the life of the optical scanning device.

Here, even after the oxide films and fluorocarbon are removed from the surface of the silicon active layer 203, a natural oxide film having a thickness of several angstroms may be formed by natural oxidation on the surface of the silicon active layer 203. In the present embodiment, the state where a natural oxide film is formed on the surface of the silicon active layer 203 is also considered as a state where the surface of the silicon active layer 203 is exposed as a result of removing the oxide films.

The optical scanning device of the above embodiment can be applied to a two-dimensional optical scanning device such as an eyewear or a projector.

Also in the above embodiment, the present invention is described using a two-dimensional optical scanning device as an example. However, the present invention is also applicable to a one-dimensional optical scanning device in which a mirror is rotated in one direction.

An aspect of this disclosure makes it possible to prevent torsion bars from being damaged.

An optical scanning device according to the embodiment of the present invention is described above. However, the present invention is not limited to the specifically disclosed embodiment, and variations and modifications may be made without departing from the scope of the present invention.

What is claimed is:

1. An optical scanning device, comprising:
    a mirror that includes a mirror reflection surface; and
    torsion bars that support corresponding sides of the mirror and cause the mirror to rotate,
    wherein the torsion bars are formed of a silicon active layer whose surface is exposed.

2. The optical scanning device as claimed in claim 1, wherein an upper surface, a lower surface, and side surfaces of the silicon active layer forming the torsion bars are exposed.

3. The optical scanning device as claimed in claim 1, wherein the mirror reflection surface is formed in a region of the silicon active layer other than regions where the torsion bars are formed.

4. The optical scanning device as claimed in claim 3, wherein the mirror reflection surface is formed of a metal film that is formed on the silicon active layer via an oxide film.

5. The optical scanning device as claimed in claim 4, further comprising:
    a reflectance increasing film that is formed on the mirror reflection surface.

6. The optical scanning device as claimed in claim 5, further comprising:
    a rib that is formed under the region of the silicon active layer where the mirror reflection surface is formed.

7. The optical scanning device as claimed in claim 6, wherein the rib is formed by patterning a support substrate disposed on a lower surface of the silicon active layer via a buried oxide layer.

8. The optical scanning device as claimed in claim 1, further comprising:
    horizontal driving beams that are connected to the torsion bars and configured to cause the mirror to rotate in a horizontal direction by resonant driving.

9. The optical scanning device as claimed in claim 8, further comprising:
    a movable frame that supports the horizontal driving beams and surrounds the torsion bars and the horizontal driving beams; and
    vertical driving beams configured to cause the movable frame to rotate in a vertical direction, wherein
    the torsion bars are arranged on a same straight line that is parallel to a longitudinal direction of the vertical driving beams.

* * * * *